April 12, 1949.　　　　　　H. L. FATE　　　　　　2,467,300
WEIGHING APPARATUS
Filed June 12, 1945　　　　　　　　　　　　　　2 Sheets-Sheet 1

INVENTOR.
HAROLD L. FATE
BY
Paul D. Flehr
ATTORNEY

April 12, 1949. H. L. FATE 2,467,300
WEIGHING APPARATUS
Filed June 12, 1945 2 Sheets-Sheet 2

INVENTOR.
HAROLD L. FATE
BY
ATTORNEY

Patented Apr. 12, 1949

2,467,300

UNITED STATES PATENT OFFICE 2,467,300

WEIGHING APPARATUS

Harold L. Fate, Oakland, Calif., assignor to Noble Company, Oakland, Calif., a partnership composed of Bert Noble and Jack D. Noble Application June 12, 1945, Serial No. 598,985

2 Claims. (Cl. 265—27)

The instant invention relates to weighing apparatus for use in connection with the mixing of concrete or other surfacing mixtures such as road mixtures and is concerned more particularly with provision of a weighing apparatus enabling easy weighing of the different ingredients of a mixture.

It is a general object of the invention to provide improved apparatus for weighing the different ingredients of concrete or road surfacing mixtures and the like.

Another object of the invention is to provide an improved weighing apparatus of the above character in which the various ingredients can be weighed successively by means of a common weighing apparatus.

Another object of the invention is to provide improved weighing apparatus of the above character having means for effecting quick reconditioning of the apparatus for weighing successive batches of material.

Other objects and advantages of the invention will be apparent from the following description of a preferred embodiment of the invention, as illustrated in the accompanying drawings, in which.

Figure 1:
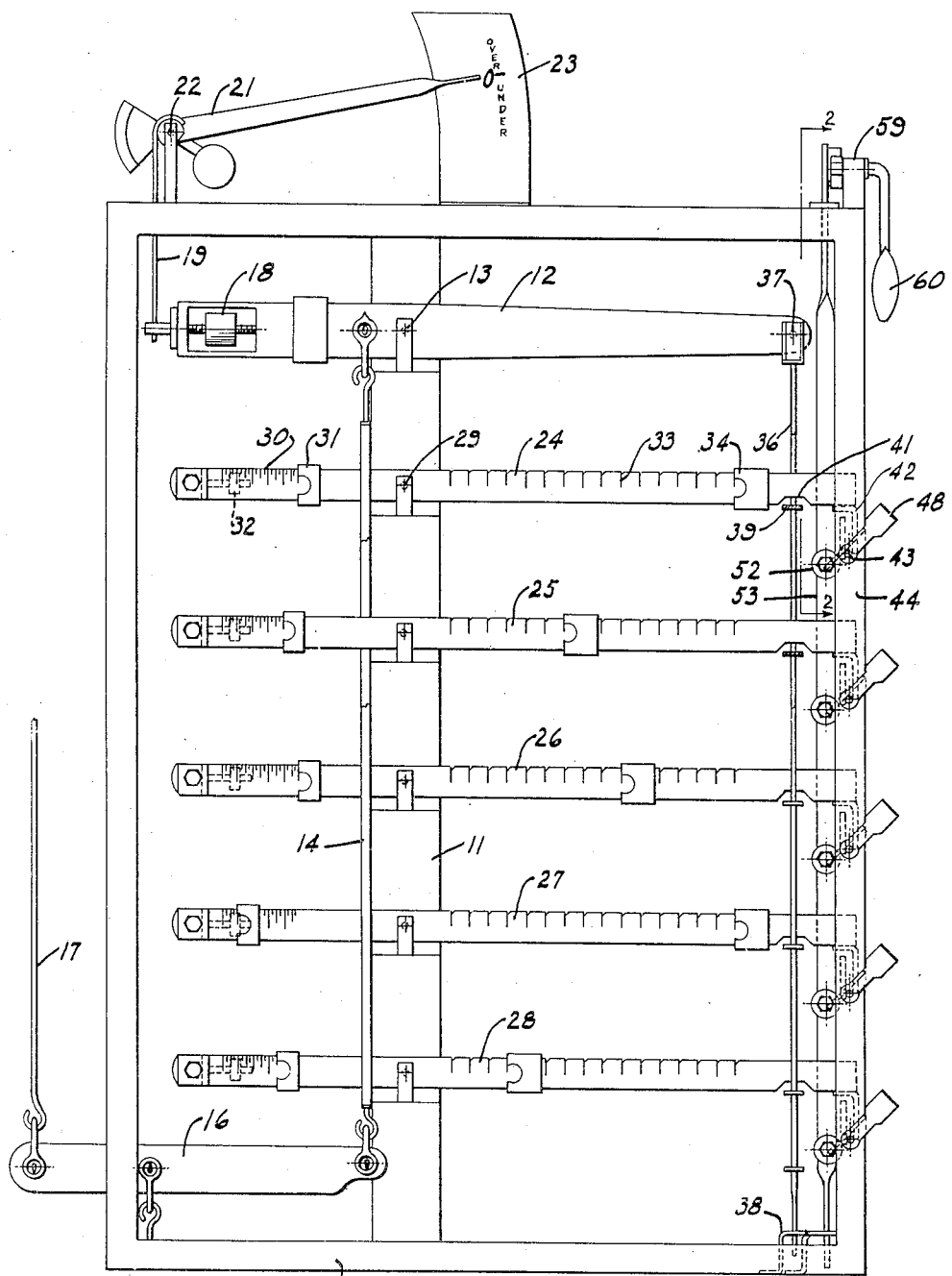
Figure 1 is an elevational view, partly in section, of a weighing apparatus embodying the invention.

Referring to Figure 1, the weighing apparatus includes a rectangular sheet metal frame 10 having a central framepiece 11 extending between the top and bottom portions of the frame to provide a support for the various weighing beams.

The weighing beams include a master weighing beam 12 having a pivotal support at 13 on the framepiece 11 and connected through a link 14, a lever 16, and a link 17 to a bin (not shown) of the type commonly employed for receiving different ingredients of a mixture, such as concrete or the like. The various pivotal connections in the above described linkage are all formed by suitable knife-edge constructions. The weighing beam 12 is of conventional construction and includes an adjustable weight 18 of the usual character for adjusting the weight distribution of the beam to a balanced condition. The beam 12 is connected by a wire cord 19 to an indicator arm 21 which is pivoted at 22 on the frame. The arm 21 has its pointer end cooperating with a plate 23 having a line indicating a balanced condition of the beam 12 and indicia "over" and "under" at either side of the line.

Associated with the main weighing beam 12 are a series of auxiliary weighing beams 24, 25, 26, 27 and 28, each provided with a pivotal support 29, a scale 30 at one end having an auxiliary weight 31 and a screw weight 32 associated therewith to obtain a balanced condition of the beam. Each of these auxiliary beams also includes a scale 33 and a weight 34 cooperating therewith for setting of an appropriate weight of material to be used in a mixture. These various auxiliary beams may be used, for example, in proportioning the amount of cement, fine aggregate, coarse aggregate, sand and water to be employed in a given mixture of concrete.

In order to connect the various auxiliary weighing beams with the main weighing beam, a depending linkage 36 is provided having a pivotal connection at 37 with one end of the beam 12, and slidably engaged with a guide bracket 38 at the opposite end. The two bars which form the linkage 36 extend to either side of the various auxiliary weighing beams, and have immediately beneath each beam a transverse connecting strip 39 adapted to seat within a recess 41 of the related beam. In this way any auxiliary weighing beam can be connected to transmit its unbalanced weight to the master weighing beam 12 which is connected to the bin in which the mixture is made as previously described.

Figure 3:
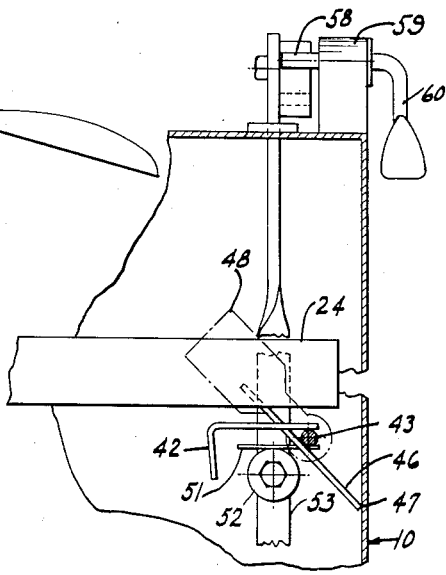
Figure 3 is a sectional view of the weighing apparatus taken as indicated by the line 3—3 in Figure 2.
Figure 5:
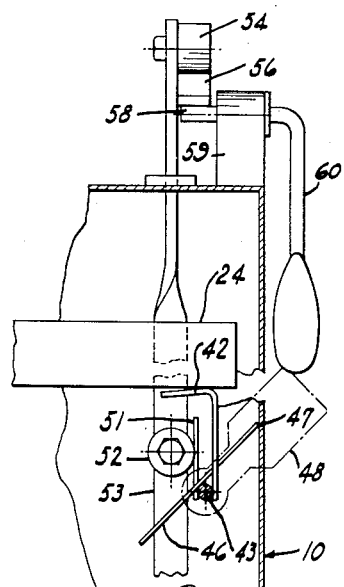
Figure 5 is a view similar to Figure 3, but showing the parts in a position corresponding to that of Figure 4.

The various auxiliary weighing beams are normally latched in disconnected relation to the master weighing beam and the linkage 36 and may be connected selectively to the linkage 36 by an adjustable latch mechanism that is similar for each auxiliary beam. A latching member 42 is provided for each beam having a flat end adapted for engagement beneath the associated weighing beam, as shown in Figures 1 and 5. Each latching member 42 is mounted on a rod 43 which, in turn, is pivotally mounted in opposed flanges 44 of the frame 10. The rod 43 also supports a stop lever 46 which in the latched condition of the beam has one end engaging the adjacent wall 47 of the frame 10, as shown in Figure 5, and in the unlatched condition has its opposite end engaged therewith, as shown in Figure 3. The rod 43 also carries an operating handle 48 by means of which it may be manually adjusted between the two positions shown in Figures 3 and 5. It will be noted that the swinging movement of each handle 48 between limiting positions (see Figures 3 and 5) is over the axis of shaft 43 (i. e. past dead center position) and therefore the weight of the handle tends to retain the member 42 in either one or the other of its operating positions. In the position of the parts shown in Figure 5, the weight of the auxiliary weighing beam is off center with respect to the pivot shaft 43 of the latch 42 and acts to hold it in latching position.

Figure 2:
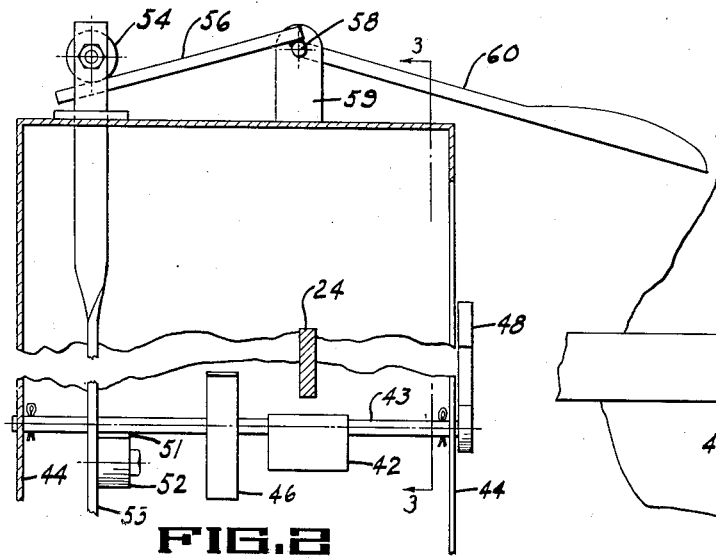
Figure 2 is an enlarged sectional view of a portion of the weighing apparatus taken as indicated by the line 2—2 in Figure 1 and showing the various weighing beams in unlatched condition.
Figure 4:
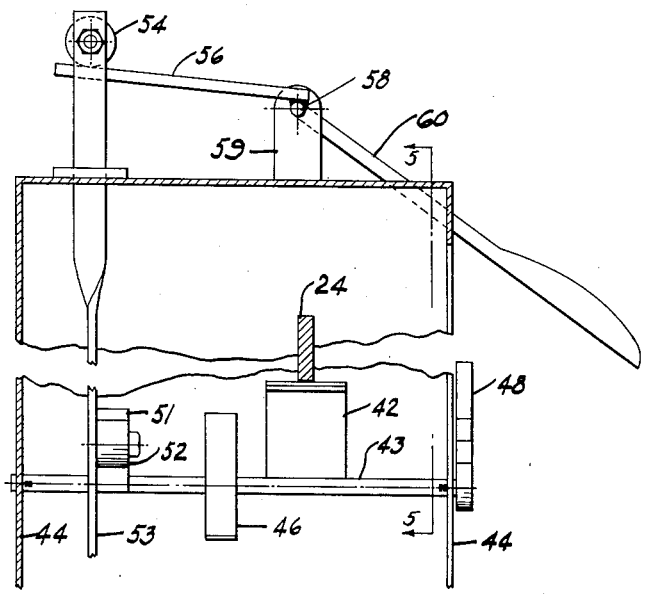
Figure 4 is a view similar to Figure 2, but showing the parts as conditioned with the various weighing beams latched against operation.

To enable quick resetting of the various latches from an unlatching position to a latching position, i. e., from the position shown in Figure 3 to that shown in Figure 5, each rod 43 carries a latch controlling arm 51 mounted for engagement by a roller 52 carried by a bar 53 which is slidably mounted in the bracket 38 and in the top wall of the frame 10. The bar 53 (Figure 2) also carries a roller 54 at its upper end operatively related with an arm 56 carried by a shaft 58 journaled in a frame bracket 59. The shaft 58 also carries an operating handle 60. By movement of the handle 60 from the position shown in Figure 2 to that shown in Figure 4 the bar 53 is raised so that the associated rollers 52 engage the cooperating arms 51 and swing the latches 42 simultaneously from the position shown in Figure 3, for example, to that shown in Figure 5. The latch controlling means including the bar 53 and the handle 60 are restored by gravity to the position shown in Figure 1.

In operation the desired weights of the different ingredients are set on the respective auxiliary weighing beams with the beams in latched condition. Each auxiliary weigh beam is unlatched and connected to the master weighing beam as the ingredient to which it corresponds is being added to the weighing and mixing bin, the unlatching and weighing operations being performed successively. After a batch of material has been weighed and discharged from the weighing bin, the weighing apparatus is conditioned for the next batch of material by disconnecting and relatching the auxiliary weighing beams by operation of the handle 60 to restore the parts to the positions shown in Figure 1.

I claim:

1. In weighing apparatus for use in mixing batches of concrete or other road mixtures, a master weighing beam, a plurality of auxiliary weighing beams each adapted to be cooperatively connected with the master beam for weighing ingredients of a batch, means for disconnecting each beam with respect to the master beam comprising a latch member for each beam, a shaft serving to mount each latch member for pivotal movement between out of the way and beam-disabling positions relative to its associated beam, means attached to each shaft for individual operation of the same whereby the associated auxiliary beam can be operatively connected or disconnected with respect to the master beam, a cam finger attached to each shaft, a reciprocable reset bar extending along all of the shafts, and a plurality of cam engaging elements carried by the reset bar and adapted to engage said cam fingers upon movement of the reset bar in one direction and to thereby reset all of said latch members in their disabling positions.

2. In weighing apparatus for use in mixing batches of concrete or other road mixtures, a generally horizontal master weighing beam, a plurality of horizontally extending auxiliary weighing beams disposed in vertically spaced relationship with respect to each other and the master beam and adapted to cooperatively connect with the master beam for weighing ingredients of the batch, means for disconnecting each auxiliary beam with respect to the master beam comprising a latch member, a horizontally extending shaft serving to mount each latch member for pivotal movement between out of the way and beam-disabling positions relative to the associated auxiliary beam, all of said shafts being disposed in vertical alignment, a handle attached to the end of each shaft for individual operation of the same whereby the auxiliary beams can be selectively connected to the master beam, a cam finger attached to each shaft, a vertically extending reciprocable reset bar extending adjacent the shaft, a plurality of vertically spaced cam engaging elements carried by the reset bar and adapted to engage said cam fingers, movement of the reset bar in one direction serving to turn said shafts to reset all of said latch members in their beam disabling positions.

HAROLD L. FATE.

REFERENCES CITED

The following references are of record in the file of this patent:

UNITED STATES PATENTS

| Number | Name | Date |
|---|---|---|
| 1,788,580 | Mandt | Jan. 13, 1931 |
| 1,985,542 | Jacobus | Dec. 25, 1934 |
| 2,066,012 | McCrery | Dec. 29, 1936 |
| 2,193,594 | Johnson | Mar. 12, 1940 |
| 2,343,000 | Carliss | Feb. 29, 1944 |